US006668292B2

(12) United States Patent
Meyer et al.

(10) Patent No.: US 6,668,292 B2
(45) Date of Patent: Dec. 23, 2003

(54) SYSTEM AND METHOD FOR INITIATING A SERIAL DATA TRANSFER BETWEEN TWO CLOCK DOMAINS

(75) Inventors: Derrick R. Meyer, Austin, TX (US); Philip Enrique Madrid, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 29 days.

(21) Appl. No.: 10/095,019

(22) Filed: Mar. 11, 2002

(65) Prior Publication Data

US 2002/0090046 A1 Jul. 11, 2002

Related U.S. Application Data

(62) Division of application No. 09/386,650, filed on Aug. 31, 1999, now Pat. No. 6,393,502.

(51) Int. Cl.$^7$ ................................................ G06F 13/14
(52) U.S. Cl. ........................ 710/61; 710/58; 710/305; 713/400; 235/380; 375/354
(58) Field of Search ........................... 710/61, 58, 305, 710/400; 235/380; 375/354

(56) References Cited

U.S. PATENT DOCUMENTS

| 3,725,793 | A | 4/1973 | Phillips | 327/160 |
|---|---|---|---|---|
| 4,929,854 | A | 5/1990 | Iino et al. | 327/297 |
| 4,970,405 | A | 11/1990 | Hagiwara | 327/145 |
| 4,989,175 | A | 1/1991 | Boris et al. | 713/401 |
| 5,058,132 | A | 10/1991 | Li | 375/260 |

(List continued on next page.)

FOREIGN PATENT DOCUMENTS

EP 0 273 234 7/1988

OTHER PUBLICATIONS

*Alpha Microprocessors SROM Mini–Debugger, User's Guide,* Apr. 1999, Compaq Computer Corp., Chapter 2, pp. 1–5; Chapter 3, pp. 1–38.

*Alpha 21264 Microprocessor Hardware Reference Manual,* Jul. 1999, Compaq Computer Corp., Chapter 7, pp. 1–21; Chapter 11, pp. 1–7.

*Digital Semiconductor Alpha 21164PC Microprocessor, Hardware Reference Manual,* Sep. 1997, Digital Equipment Corp., Chapter 4, pp. 8–10; Chapter 7, pp. 1–13.

*Alpha 21164 Microprocessor Hardware Reference Manual,* Dec. 1998, Compaq Computer Corp., Chapter 4, pp. 6–11; Chapter 7, pp. 1–14.

International Search Report, Application No. PCT/US 00/07695, mailed Oct. 4, 2000.

*Primary Examiner*—Abdelmoniem Elamin
(74) *Attorney, Agent, or Firm*—Meyertons, Hood, Kivlin, Kowert & Goetzel, P.C.; B. Noël Kivlin

(57) ABSTRACT

A system and method for transferring a data stream between devices having different clock domains. The method initiates a serial data stream between a transmitter and a receiver. The transmitter operates according to a first clock having a first clock rate, and the receiver operates according to a second clock having a second clock rate. A ratio between the second clock rate and the first clock rate is an integer number greater than or equal to one. A first state is provided over a serial line between the transmitter and the receiver One or more start bits are provided over the serial line. The start bits indicate a second state different from the first state. One or more ratio bits are provided over the serial line after the start bit. The ratio bits indicate the ratio between the second clock rate and the first clock rate. The start bits are received. Using a transition between the first state and the second state evident in receiving each of the start bits, the ratio bits are received. The remainder of the serial data stream is received at appropriate intervals of the second clock rate.

10 Claims, 11 Drawing Sheets

U.S. PATENT DOCUMENTS

| | | | |
|---|---|---|---|
| 5,256,994 A | 10/1993 | Langendorf | 331/16 |
| 5,307,381 A | 4/1994 | Ahuja | 375/356 |
| 5,623,522 A | 4/1997 | Ito | 375/369 |
| 5,748,684 A * | 5/1998 | Sanchez | 375/357 |
| 5,825,834 A * | 10/1998 | Chambers et al. | 375/360 |
| 5,909,563 A | 6/1999 | Jacobs | 710/305 |
| 6,009,107 A * | 12/1999 | Arividsson et al. | 370/535 |
| 6,026,133 A * | 2/2000 | Sokoler | 375/365 |
| 6,038,254 A * | 3/2000 | Ferraiolo et al. | 375/232 |
| 6,044,421 A * | 3/2000 | Ishii | 710/61 |
| 6,240,151 B1 * | 5/2001 | Ko | 375/370 |
| 6,249,555 B1 * | 6/2001 | Rainbolt | 375/354 |
| 6,431,442 B1 * | 8/2002 | Genevois et al. | 235/380 |

* cited by examiner

SYSTEM AND METHOD FOR INITIATING A SERIAL DATA TRANSFER BETWEEN TWO CLOCK DOMAINS

This is a Division of Ser. No. 09/386,650 filed on Aug. 31, 1999 now U.S. Pat. No. 6,393,502.

BACKGROUND OF THE INVENTION

1. Field of the Invention

This invention relates to data communications, and more particularly to a system and method for initiating a serial data transfer between a first device clocked according to a first clock and a second device clocked according to a second clock.

2. Description of the Related Art

In computer systems, especially computer systems including devices that may operate according to differing internal clocks with different clock rates, some mechanism is needed to assure that data transfers can occur between the devices. Typically, synchronous transfers are used to guarantee that data transferred from one device to another is received properly. In a synchronous transfer, the clocking signal is generated by the sending device and transmitted along with the data, so that the data can be properly clocked as sent. When the sending and receiving devices operate according to different clock rates, data transfers are usually limited to the clock rate of the slower device.

One solution to speeding up transfer rates is to use an asynchronous transfer method so that high transfer rates may be achieved between devices operating at different clock rates. In an asynchronous transfer, the clock is not transmitted with the data. One problem that arises is that the asynchronous transfers must be initiated between the devices. What is needed is a system and method for transmitting a data stream between devices operating in differing clock domains, which may have differing clock rates.

SUMMARY OF THE INVENTION

The problems outlined above are in large part solved by a system and method for transferring a data stream between devices having different clock domains. In an exemplary computer system, one or more processors are each coupled to a bridge through separate high speed connections, which in one embodiment each include a pair of unidirectional address buses with respective source-synchronous clock lines and a bi-directional data bus with attendant source-synchronous clock lines. System memory and Broadly speaking, a method is contemplated for initiating a serial data stream between a transmitter and a receiver. The transmitter operates according to at least a first clock having a first clock rate, and the receiver operates according to at least a second clock having a second clock rate. A ratio between the second clock rate and the first clock rate is an integer number greater than or equal to one. The method comprises providing a first state over a serial line between the transmitter and the receiver. The method also includes providing one or more start bits over the serial line. The start bits indicate a second state different from the first state. The method also provides one or more ratio bits over the serial line after the start bit. The ratio bits indicate the ratio between the second clock rate and the first clock rate. The method receives the one or more start bits. Using a transition between the first state and the second state evident in receiving each of the start bits, the method receives the one or more ratio bits. The method also includes receiving a remainder of the serial data stream at appropriate intervals of the second clock rate.

A computer system is also contemplated. Broadly speaking, the computer system comprises a memory, logic, and at least one processor. The memory is configured to store initialization information for the computer system. The initialization information begins with a start bit and a ratio bit. The ratio bit is encoded with the ratio between a second clock rate and a first clock rate. The logic is coupled to the memory for transmitting the initialization information. The logic is configured to operate according to the first clock rate and to transmit the initialization information at the first clock rate. The processor is coupled to receive a first system clock operating at the first clock rate and a second system clock operating at the second clock rate. The processor is configured to operate according to the second system clock. The processor is further coupled to the logic with a serial line over which to receive the initialization information. The logic is configured to transmit the initialization information over the serial line to the processor. The logic is further configured to transmit a first state over the serial line prior to the start bit. The start bit includes a second state different from the first state. The processor is further configured to receive the start bit and to use a transition between the first state and the second state evident in receiving the start bit to receive the ratio bit. The processor is further configured to decode the ratio bit to determine the first clock rate in order to receive the remainder of the initialization information from the logic.

BRIEF DESCRIPTION OF THE DRAWINGS

Other objects and advantages of the invention will become apparent upon reading the following detailed description and upon reference to the accompanying drawings in which.

Figure 1:
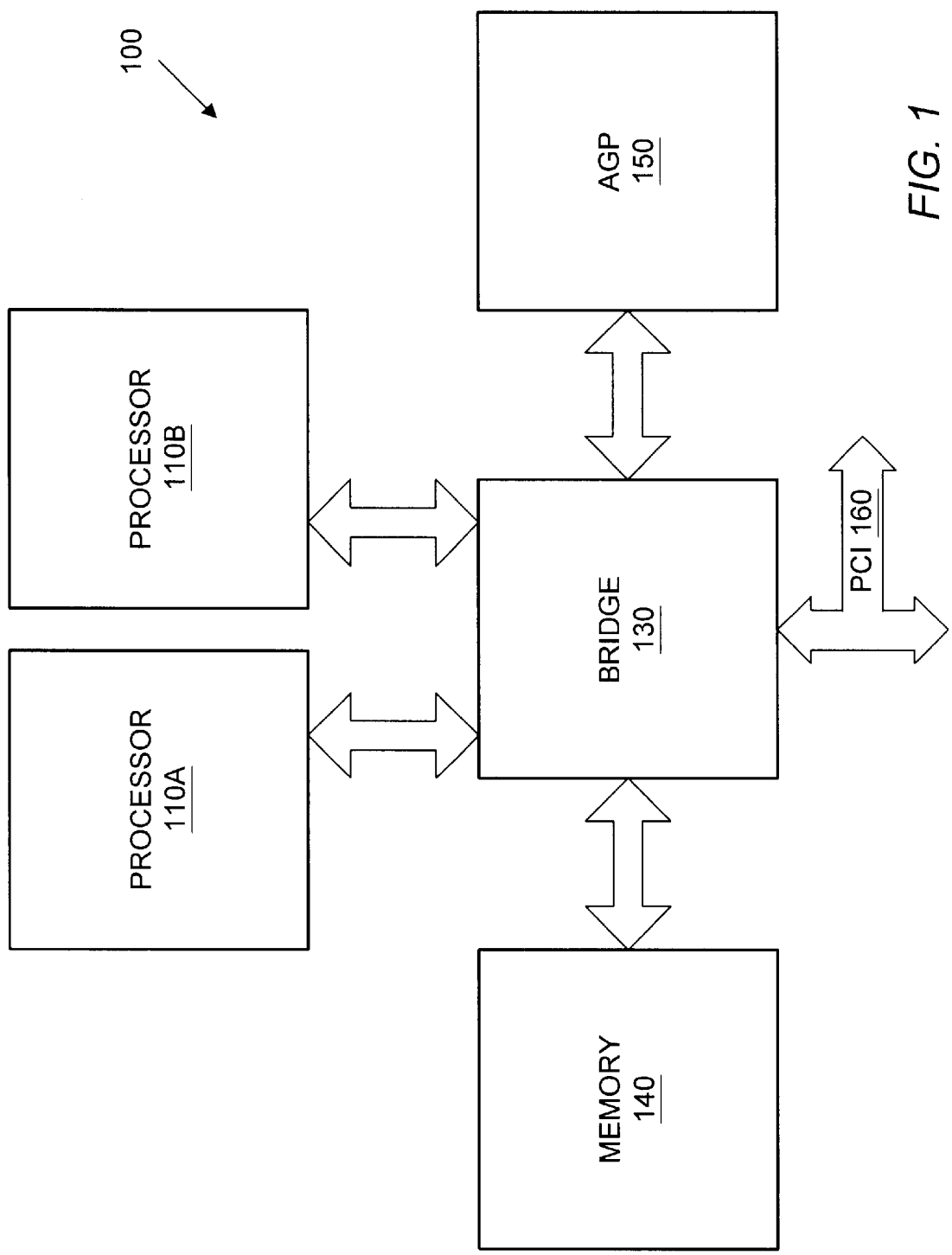
FIG. 1 is a block diagram of an embodiment of a computer system including two processors with separate buses coupling the processors to a bridge.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning to FIG. 1, a block diagram of an embodiment of a generalized computer system 100 is illustrated. A first processor 110A and a second processor 110B each couple to a bridge 130 through separate processor buses. Both the first processor 110A and the second processor 110B are preferably configured to perform memory and I/O operations using their respective processor buses. In one embodiment, processors 110A and 110B implement the x86 instruction set architecture. Other embodiments may implement any suitable instruction set architecture. The bridge 130 is further coupled to a memory 140. The memory 140 is preferably configured to store data and instructions accessible to both the first processor 110A and the second processor 110B, as well as other system devices. The memory 140 may be comprised of SDRAM (Synchronous Dynamic Random Access Memory), RDRAM (Rambus DRAM) [RDRAM and RAMBUS are registered trademarks of Rambus, Inc.], or any other suitable memory type. An advanced graphics port device (AGP) 150 is also optionally coupled to the bridge 130. As shown, a Peripheral Component Interconnect (PCI) bus 160 is also coupled to the bridge 130. A variety of I/O components may be coupled to the PCI bus 160.

It is noted that in embodiments of the computer system 100 including a legacy bus, such as an Industry Standard Architecture (ISA) bus, the bridge 130 is often referred to an a northbridge 130, with the bridge (not shown) between the PCI bus 160 and the legacy bus referred to as a southbridge. It is also noted that in the illustrated embodiment, the bridge 130 is the system master for the computer system 100. While the illustrated embodiment includes two processors 110A and 110B, it is noted any number of processors 110 may be included in the computer system 100 as desired.

In the illustrated embodiment, as the system master, the bridge 130 operates to coordinate communications between processors 110A and 110B, the memory 140, and the AGP device 150, as well as devices coupled to the PCI bus, etc. The bridge 130 maintains coherency for data transfers among the devices of the computer system 100 by probing processor 110A and/or processor 110B for memory locations accessed by the other processor 110A or 110B, the AGP device 150, or a PCI device on the PCI bus 160, etc.

Figure 2:
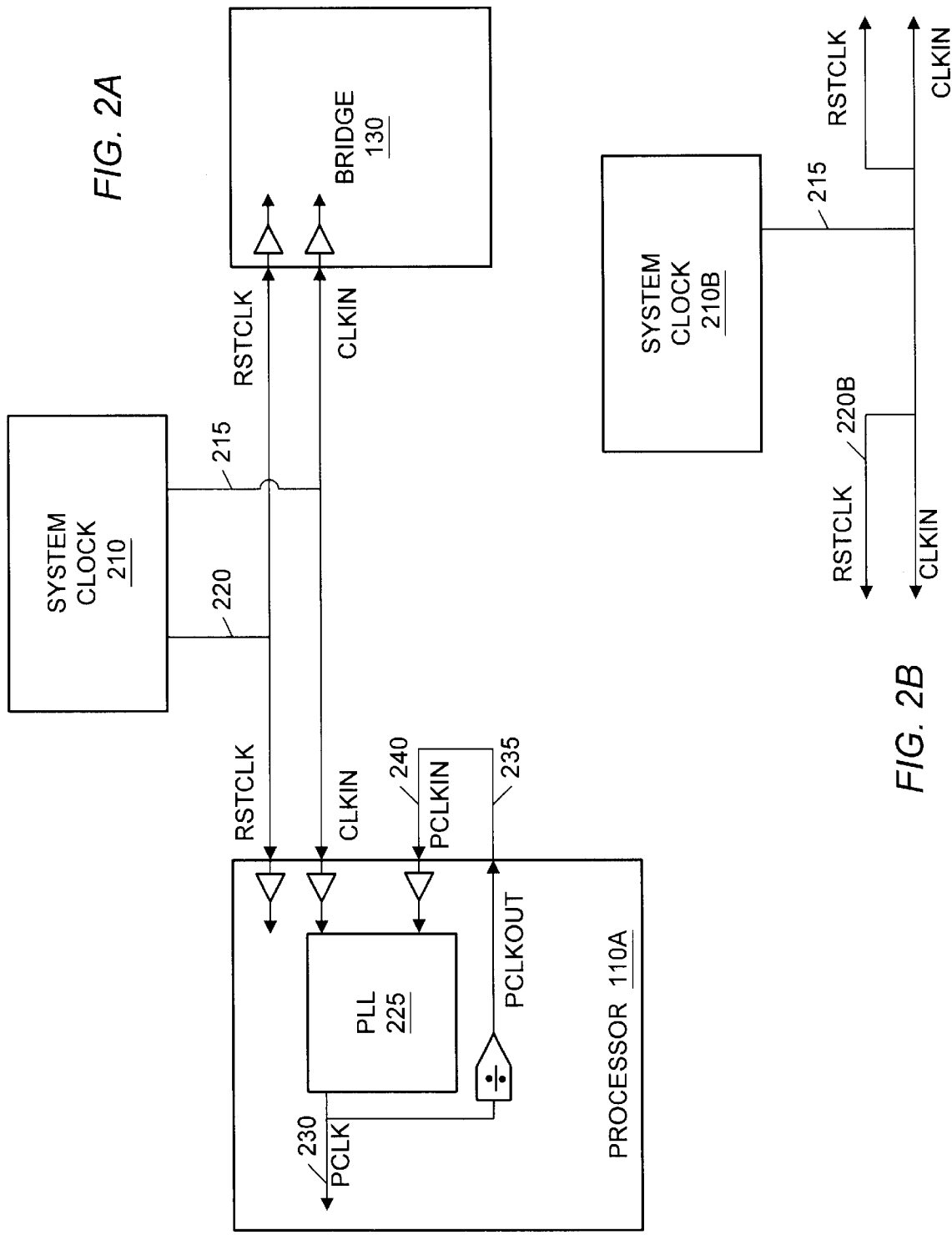
FIG. 2A is a block diagram of an embodiment of one of the processors and the bridge of FIG. 1 configured to accept two system clock signals from a system clock.
FIG. 2B is a block diagram of an alternative embodiment of the system clock of FIG. 2A, where the system clock provides a single clock signal over more than one clock line.

Turning now to FIG. 2A, a block diagram of an embodiment of one of the processors 110A and the bridge 130 of FIG. 1 are illustrated. As shown, a system clock 210 is coupled to provide a first system clock CLKIN 215 and a second system clock RSTCLK 220 to each of the processor 110A and the bridge 130. The bridge 130 is shown operating according to at least one of the two system clocks, CLKIN 215 and/or RSTCLK 220. The processor 110A receives the RSTCLK 220 and the CLKIN 215. Processor 110A inputs first system clock CLKIN 215 into a PLL 225 and generates a processor clock PCLK 230. Processor clock PCLK 230 preferably operates at a frequency that is a multiple of the first system clock CLKIN 215. The processor clock signal PCLK 230 is divided by a constant value to create PCLK-OUT 235, which is routed out of the processor 110A and back into the processor 110A as PCLKIN 240. The constant value used to divide the processor clock signal PCLK 230 to create PCLKOUT 235 is preferably the same as the multiple used to create the processor clock signal PCLK 230 from the first system clock CLKIN 215. PCLKIN 240 is used as the feedback clock signal for the PLL 225.

Thus, the system clock 210 may provide two clock signals to each of the processor 110A and the bridge 130. In one embodiment, RSTCLK 220 has a clock rate of 50 MHz. In this embodiment, CLKIN 215 has a clock rate 100 MHz. PLL 225 of processor 110A operates to generate a processor clock 230 with a clock rate of 500 MHz. The division element divides the processor clock 230 by 5 to generate PCLKOUT 235 at 100 MHz. PCLKIN 240 also has a clock rate of 100 MHz. It is noted that bridge 130 may operate according to the 50 MHz RSTCLK 220, the 100 MHz clock CLKIN 215, or may implement a PLL, such as PLL 225 of processor 110A, to generate, for example, an internal clock at almost any frequency.

Turning now to FIG. 2B, a block diagram of an alternative embodiment of the system clocking of FIG. 2A is shown. In this embodiment, the system clock 210 provides a single clock signal over more than one clock line. As shown, system clock 210B outputs a system clock 215 that is routed as both CLKIN 215 and RSTCLK 220B. Thus, in one embodiment both RSTCLK 220B and CLKIN 215 have a clock rate of 100 MHz.

It is noted that the ratio between CLKIN 215 and RSTCLK 220 is preferably an integer greater than or equal to one. Thus, the ratio between CLKIN 215 and RSTCLK 220 may be 1, 2, 3, etc. It is also noted that in a preferred embodiment, there is a minimal phase difference between a rising edge of CLKIN 215 and a corresponding rising edge of RSTCLK 220.

Figure 3:
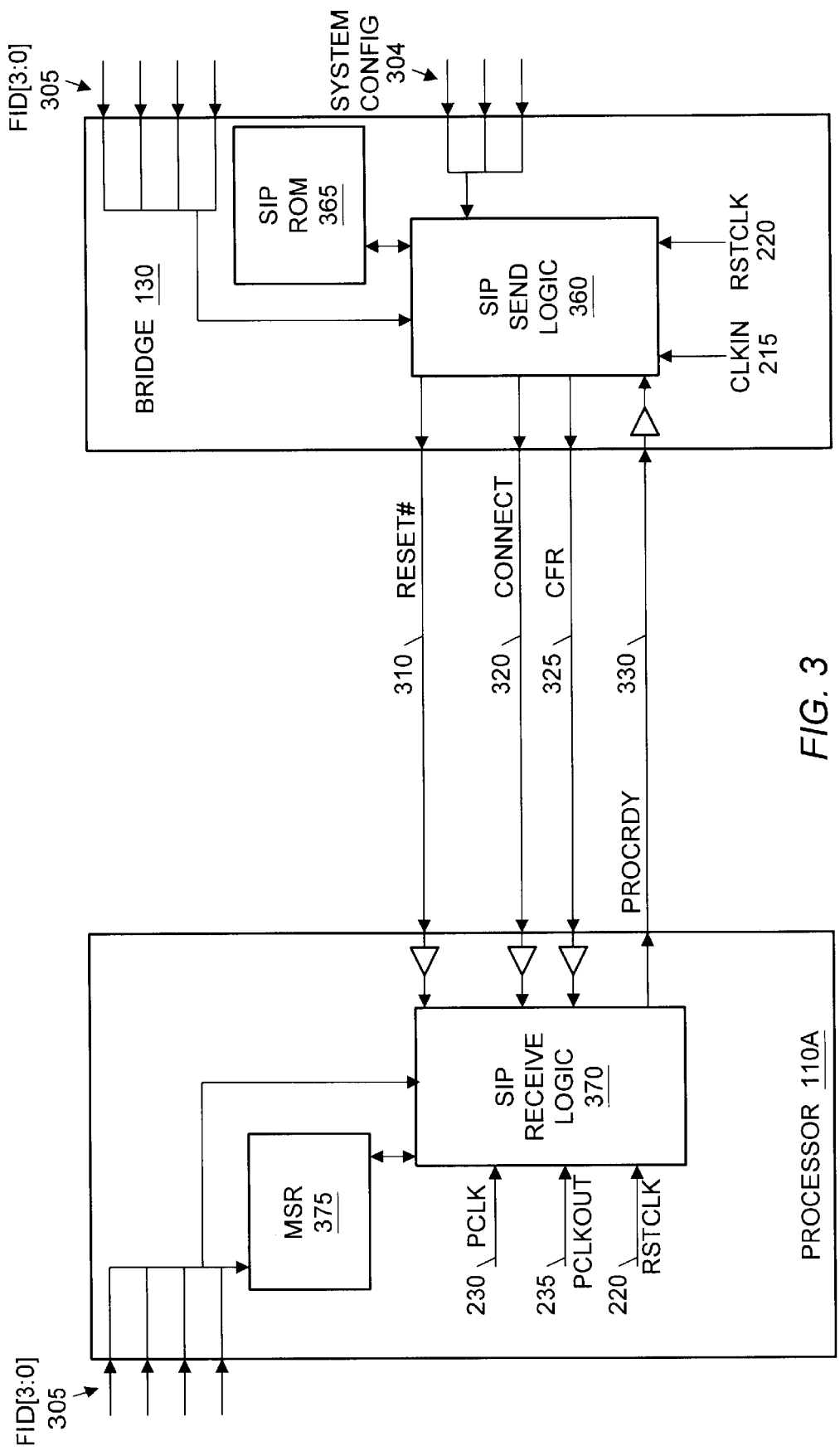
FIG. 3 is a block diagram of an embodiment of one of the processors and the bridge of FIG. 1, including input signals to the processor and the bridge as well as exemplary signals exchanged between the processor and the bridge, wherein the bridge includes a ROM for storing configuration data.

Turning now to FIG. 3, a block diagram of an embodiment of one of the processors 110A and the bridge 130 of FIG. 1 is illustrated. The exemplary details of the processor 111A, as shown in FIG. 3, include inputs of a processor clock frequency ratio, shown as FID[3:0] 305, a model specific register (MSR) 375, and a SIP receive logic 370. Also as illustrated, bridge 130 accepts inputs for the FID [3:0] 305, inputs for system configuration 304, a SIP ROM 365, and SIP send logic 360.

As shown, the SIP send logic 360 of the bridge 130 receives CLKIN 215 and RSTCLK 220. The SIP send logic 360 is also coupled to receive the FID[3:0] 305 values, the system configuration data 304, as well as data read from the SIP ROM 365.

Also as shown, the SIP receive logic 370 accepts PCLK 230, PCLKOUT 235, and RSTCLK 220 as inputs, as well as the processor clock frequency ratio FID[3:0] 305 and values read from MSR 375. The FID[3:0] 305 values are input to the MSR 375 as well as provided to the SIP receive logic 370. It is noted that the SIP ROM 365 may include a plurality of configuration sets. In one embodiment, the SIP ROM 365 is indexed by the length of the motherboard to which the bridge 130 is attached and by the frequency ID FID[3:0] values. Other methods of indexing a particular configuration set for retrieval from the plurality of configurations stored in the SIP ROM 365 are also contemplated.

The SIP send logic 360 outputs, as shown, RESET#310, CONNECT 320, and CFR (Clock Forward Reset) 325. Each of RESET#310, CONNECT 320, and CFR 325 are buffered into processor 110A and provided to the SIP receive logic 370. The SIP receive logic 370 provides the PROCRDY 330 signal to the bridge 130, where the PROCRDY signal 330 is provided to the SIP send logic 360.

Figure 4:
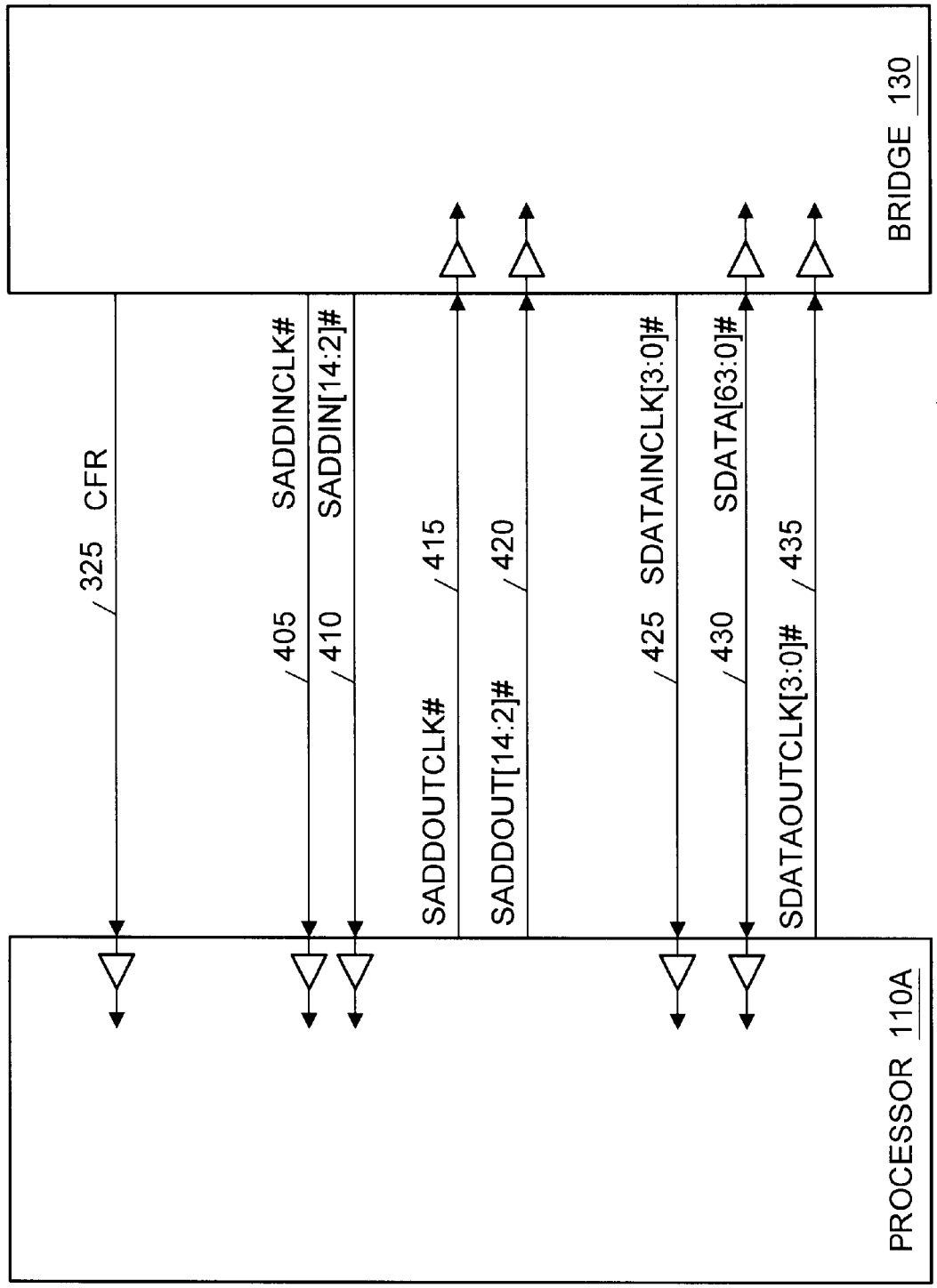
FIG. 4 is a block diagram of an embodiment of one of the processors and the bridge of FIG. 1, including exemplary address, data, and control signals exchanged between the processor and the bridge.

Turning now to FIG. 4, an embodiment of one of the processors 110A and the bridge 130 of FIG. 1 is shown. Also shown are exemplary address, data, and control signals exchanged between the processor 110A and the bridge 130. The CFR signal 325 is sent from the bridge 130 to processor 110A, where the CFR signal 325 is buffered into the processor 110A. Address in lines SADDIN[14:2]# 410 are provided from the bridge 130 to the processor 110A. A corresponding source-synchronous clock line SADDIN-CLK# 405 is provided to clock the data on the SADDIN [14:2]# address lines 410. Likewise, the address out lines SADDOUT[14:2]# 420 are provided from the processor 110A to the bridge 130. Corresponding address out clock line SADDOUTCLK# 415 is provided to clock the address on the SADDOUT[14:2]# address lines 420. As illustrated, 64 data lines, which make up the SDATA[63:0]# 430 lines, bi-directionally transmit data between the processor 110A and the bridge 130. A plurality of data in clock lines SDATAINCLK[3:0]# 425 provide clocking for data transferred from the bridge 130 to the processor 110A. In a similar fashion, data out clock lines SDATAOUTCLK[3:0]# 435 provides clocking for data transferred out over the SDATA lines 430 from the processor 110A to the bridge 130. Similarly to previous figures, all lines are buffered into the destination device, either the processor 110A or the bridge 130, as shown in FIG. 4.

Figure 5:
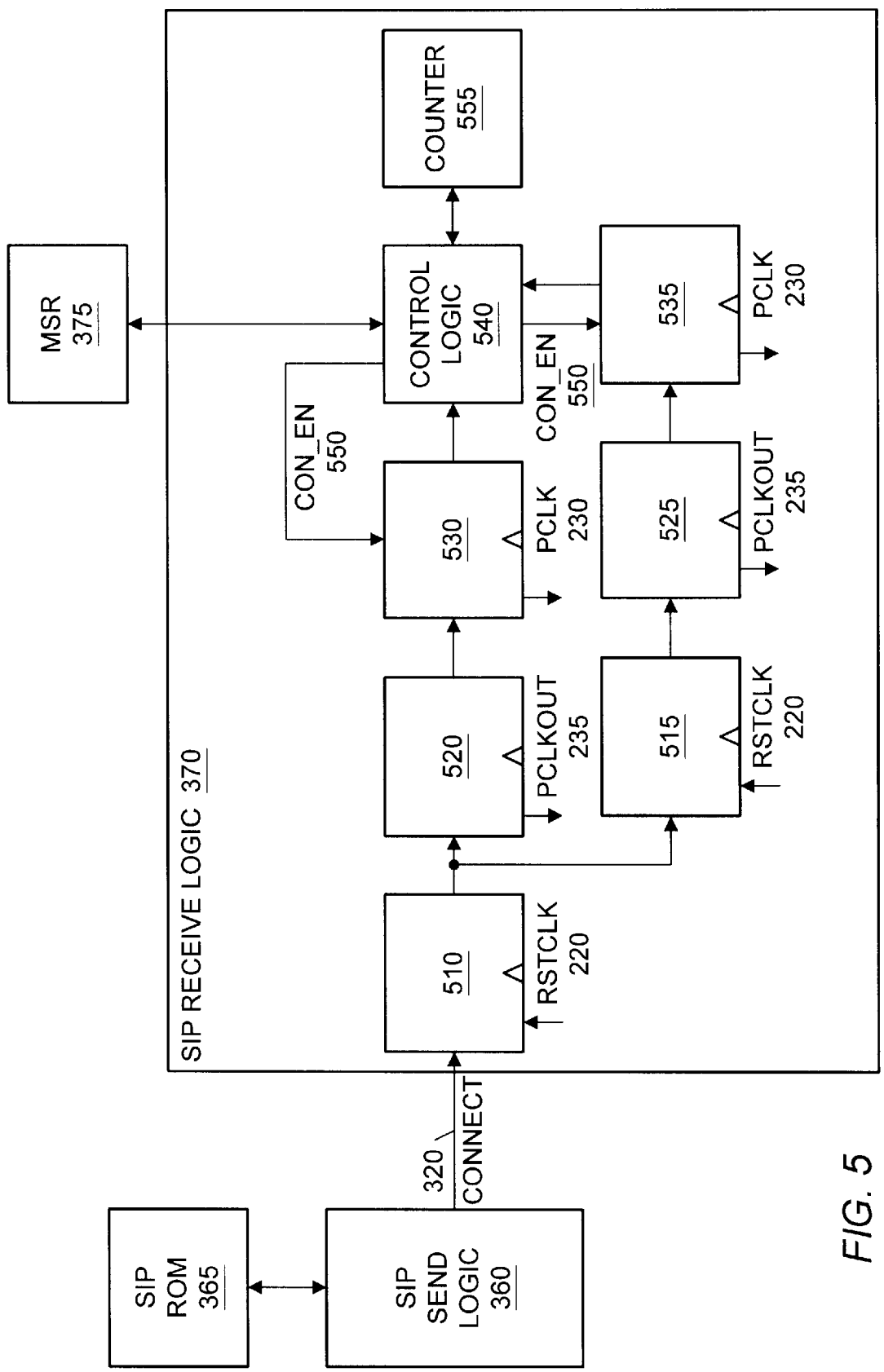
FIG. 5 is a block diagram of an embodiment of a system for transferring a serial data stream from one device to another device, when the sending device and the receiving device operate according to different internal clocks.

Turning now to FIG. 5, a block diagram of an embodiment of a system for transferring a serial data stream from one device to another device is illustrated where the sending device operates according to a different internal clock than the receiving device. In a preferred embodiment, the ratio between the faster clock and the slower clock is an integer greater or equal to 1. As shown in FIG. 5, data stored in a SIP ROM 365 is transferred to and from SIP send logic 360. SIP send logic 360 is coupled to SIP receive logic 370 over connect line 320. As shown, SIP receive logic 370 includes a first storage element 510, such as a flop, which preferably clocked on a rising edge of RSTCLK 220. Data output from storage element 510 is provided to storage element 520 and the storage element 515. The storage element 515 latches the data in preferably on a rising edge of RSTCLK 220. Storage element 520 preferably latches in data on a falling edge of PCLKOUT 235.

Data output by storage element 515 is latched into storage element 525 preferably on a falling edge of PCLKOUT 235. Data output from storage element 525 is clocked into storage element 535 preferably on a falling edge of PCLK 230. Data stored in storage element 520 is provided to storage element 530. Storage element 530, preferably latches in data from the falling edge of PCLK 230. Storage elements 530 and 535 are each enabled by conditional enable signal 550 provided by control logic 540. Upon latching data, storage elements 530 and 535 provide their data to the control logic 540.

Control logic 540 is further coupled to a counter 555 that is configured to count clock edges for control logic 540. Data provided to the control logic 540 may be stored in machine specific registers MSR 375 as desired. As shown, control logic 540 is also configured to read data from the MSR 375.

Generally speaking, a serial data stream stored in the SIP ROM 365 is read by the SIP send logic 360 and provided to the SIP receive logic 370 over connect line 320. A preferred embodiment of the SIP stream includes a start bit followed subsequently by a logic 370 latches the start bit into storage element 510 on a rising edge of RSTCLK 220. The SIP receive logic 370 then latches the start bit in storage element 515 concurrently with latching in the ratio bit in storage element 510. Both storage elements 510 and 515 prefer the latch on the rising edge RSTCLK 220. The start bit is latched into storage element 525 on the falling edge of PCLKOUT 235 concurrently with the ratio bit being latched into storage element 520.

In a similar fashion, a start bit is latched into storage element 535, the ratio bit is latched to the storage element 530. The control logic 540 is configured to enable storage in storage elements 530 and 535 during the appropriate edge of the processor clock (PCLK 230). The control logic 540 monitors the output of storage element 535 for the start bit and concurrently decodes the ratio bit from storage element 530 upon receiving the start bit from storage element 535. The ratio bit is stored in the MSR 375. The control logic is further configured to use the ratio bit to configure counter 555 for timing of the next enablement of the conditional enable line 550. Additional details on the timing and flow of the method of transferring the SIP data stream between the SIP send logic 360 and the SIP receive logic 370 over connect line 320 are given below with respect to FIGS. 6A and 6B.

Figure 6A:
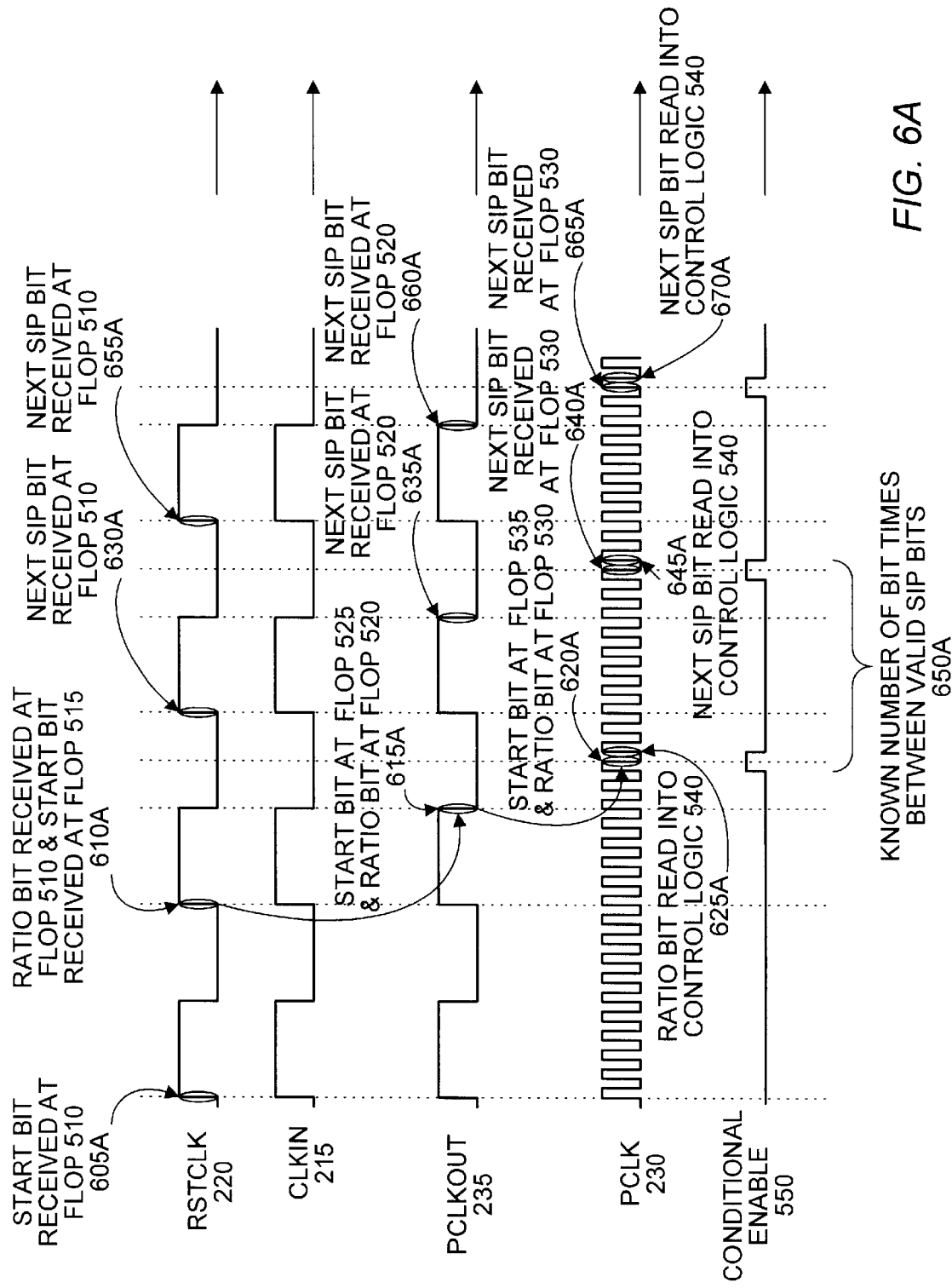
FIG. 6A is an exemplary timing diagram of an embodiment of operations of the system of FIG. 5 when the sending device is clocked at base clock rate that is equal to the receiving device.

FIG. 6A is an exemplary timing diagram of an embodiment of the operations of the system shown in FIG. 5 when the sending device is clocked at a base clock rate that is equal to the clock rate of the receiving device. Shown in FIG. 6A are RSTCLK 220, CLKIN 215, PCLKOUT 235, PCLK 230, and the conditional enable signal 550. As shown, RSTCLK 220, CLKIN 215 and PCLKOUT 235 operate according to equal clock rates. In other words, RSTCLK 220 and CLKIN 215 have a ratio of 1. PCLK 230 is illustrated with a clock rate 10 times the rate of CLKIN 215. This value of 10 corresponds to the decode of the processor clock ratio FID[3:0], which was discussed above and will be further discussed below.

On a rising edge of RSTCLK 220, start bit is received at storage element 510 (reference numeral 605A). On a next rising edge of RSTCLK 220, a ratio bit is received at storage element 510 concurrently with the start bit being received by storage element 515 (reference numeral 610A). The start bit is received at storage element 525 and the ratio bit is received at storage element 520 on the next falling edge of PCLKOUT 235 (reference numeral 615A).

A predetermined time later, as determined by the control logic 540 shown in FIG. 5, the start bit is latched in the storage element 535 and the ratio bit is latched into storage element 530 (reference numeral 620A). On the next edge of PCLK 230, the ratio bit is read into control logic 540 (reference numeral 625A). It is noted that the conditional enable signal 550 is asserted for a predetermined period of time subsequent to the start bit being latched into storage element 525 and the ratio bit being latched into storage element 520, as shown in reference numeral 615A. As illustrated, the conditional enable signal 550 is asserted for one clock period.

It is noted that the ratio bit being read into control logic 540 and reference numeral 625A decodes with a value of 1. Thus, as in the illustrated embodiment, a known number of bit times will occur between valid SIP bits as shown in reference numeral 650A. In the illustrated embodiment, that number of bit times is equal to the processor ratio 10 multiplied by the ratio bit 1 multiplied by 2 bit times per clock period. Thus, there are approximately 20 bit times between valid SIP bits (reference numeral 650). It is noted that the bit times are preferably measured with respect to PCLK 230, although other clock edges may be used as desired. In a preferred embodiment, the delay between the falling edge of PCLKOUT 235 (reference numeral 615A) and the falling edge of PCLK 230 (reference numeral 620A) is at least 4 PCLK phases (or bit times, as shown).

On a next rising edge of RSTCLK 220 the next SIP bit is received into storage element 510 (reference numeral 630A). On the next falling edge of PCLKOUT 235, the next SIP bit is received at storage element 520 (reference numeral 635A). The known number of bit times between the valid SIP bits later (reference numeral 650A), the condition enable signal 550 is asserted and the next SIP bit is latched into storage element 530 (reference numeral 640A). On the next edge of PCLK 230, the next SIP bit is read into the control logic 540 (reference numeral 645A).

On a next rising edge of RSTCLK 220 the next SIP bit is received into storage element 510 (reference numeral 655A). On the next falling edge of PCLKOUT 235, the next SIP bit is received at storage element 520 (reference numeral 660A). The known number of bit times between the valid SIP bits later (reference numeral 650A), the condition enable signal 550 is asserted and the next SIP bit is latched into storage element 530 (reference numeral 665A). On the next edge of PCLK 230, the next SIP bit is read into the control logic 540 (reference numeral 670A).

The SIP bits are read into the SIP receive logic 370 one bit at a time in a corresponding fashion until the end of the SIP data stream. In a preferred embodiment, the total number of bits in the SIP data stream is predetermined. In other embodiments, a control signal or predetermined data sequence may be used to terminate the SIP data stream.

Figure 6B:
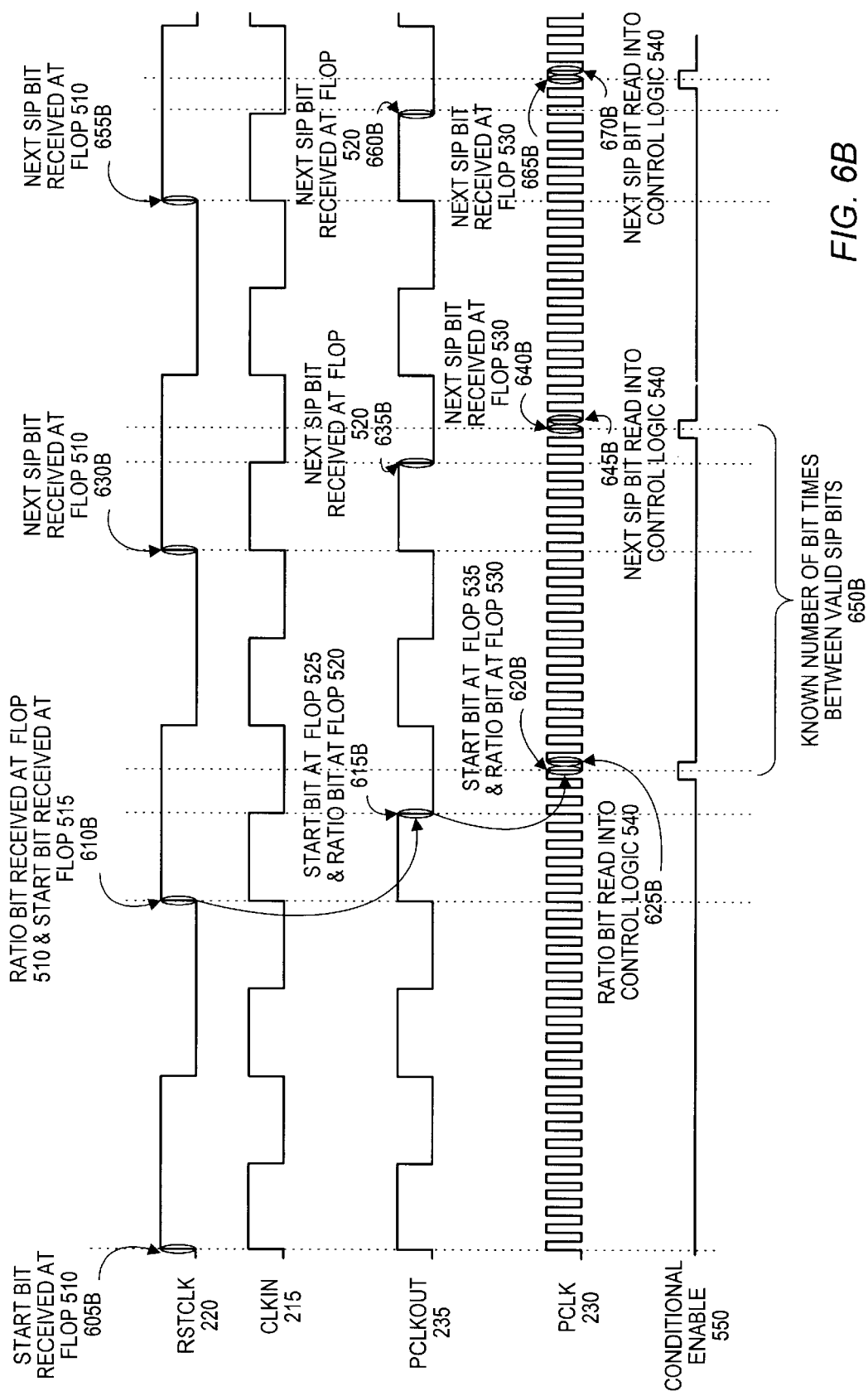
FIG. 6B is an exemplary timing diagram of an embodiment of operations of the system of FIG. 5 when the sending device is clocked at base clock rate that is one-half the base clock rate of the receiving device.

Turning now to FIG. 6B, an exemplary timing diagram of another embodiment of the operations of a system of FIG. 5 are illustrated. As shown, the sending device it clocked at a base clock rate that is one half the base clock rate of the receiving device. In FIG. 6B, CLKIN 215 and PCLKOUT 235 are shown with the same clock rate as were previously seen in FIG. 6A. PCLK 230 is also shown with the same processor clock ratio of 5 as seen in FIG. 6A. RSTCLK 220, however, is shown with a clock period that is twice that of CLKIN 215.

SIP data stream transfer between SIP send logic 360 and SIP send logic 370 occurs as follows in FIG. 6B. Start bit received at storage element 510 on a rising edge of RSTCLK 220 (reference numeral 605B). The ratio bit is received at storage element 510 concurrently with the start bit latched into storage element 515 on the next rising edge of RSTCLK 220 (reference numeral 610B). On the next falling edge of PCLKOUT 235, start bit is latched in the storage element 525 and the ratio bit is latched in the storage element 520 (reference numeral 615B).

A predetermined amount of time after the falling edge of PCLKOUT 235, the start bit is latched into storage element 535 and a ratio bit is latched in storage element 530 (reference numeral 620B). The condition enable signal 550 is asserted appropriate for latching the start bit and the ratio bit the appropriate time after the falling edge of PCLKOUT 235, similar to what is shown in FIG. 6A. On the next edge of PCLK 230, the ratio bit is read into the control logic 540 (reference numeral 625B). As before, the control logic 540 preferably stores the ratio bit in MSL 375 and uses the ratio bit to activate the counter such that the condition enable signal can be asserted at the appropriate bit time to read the next valid SIP bit. Now knowing the ratio bit value, the control logic 540 is configured to determine the known number of bit times between valid SIP bits as shown (reference numeral 650).

The calculation, as before, involves the processor clock ratio value 10 multiplied by the ratio bit which is 2 in this example, multiplied by the 2 edges per clock. Thus, approximately 40 bit times are illustrated between the edge of PCLK 230 upon which the SIP bits are read into the control logic 540 as shown at reference numeral 650B.

On the next rising edge of RSTCLK 220, the next SIP bit is received at storage element 510 (reference numeral 630B). On the next falling edge of PCLKOUT 235 the next SIP bit is latched into storage element 520 (reference numeral 635B). After the predetermined delay, the next SIP bit is clocked into storage element 530 when the conditional enable 550 is asserted (reference numeral 640B). On the next edge of PCLK 230, the next SIP bit is read into control logic 540 (reference numeral 645B).

Likewise, additional SIP bits are received and latched into storage element 510 (reference numeral 655B) on the rising edges of RSTCLK 220. The additional SIP bits are further received at storage element 520 (reference numeral 660B) on the subsequent falling edge of PCLKOUT 235 (reference numeral 660B). Again, after the predetermined period of time (see reference numeral 650B) has passed, the additional SIP bits are received at storage element 530 (reference numeral 655B), on a falling edge of PCLK 230. The additional SIP bits are read into the control logic 540 on the subsequent rising edge of PCLK 230 (reference numeral 670B). The conditional enable 550 is asserted by the control logic 540 the appropriate number of bit times since the previous valid SIP bit (see reference numeral 650B).

Figure 7:
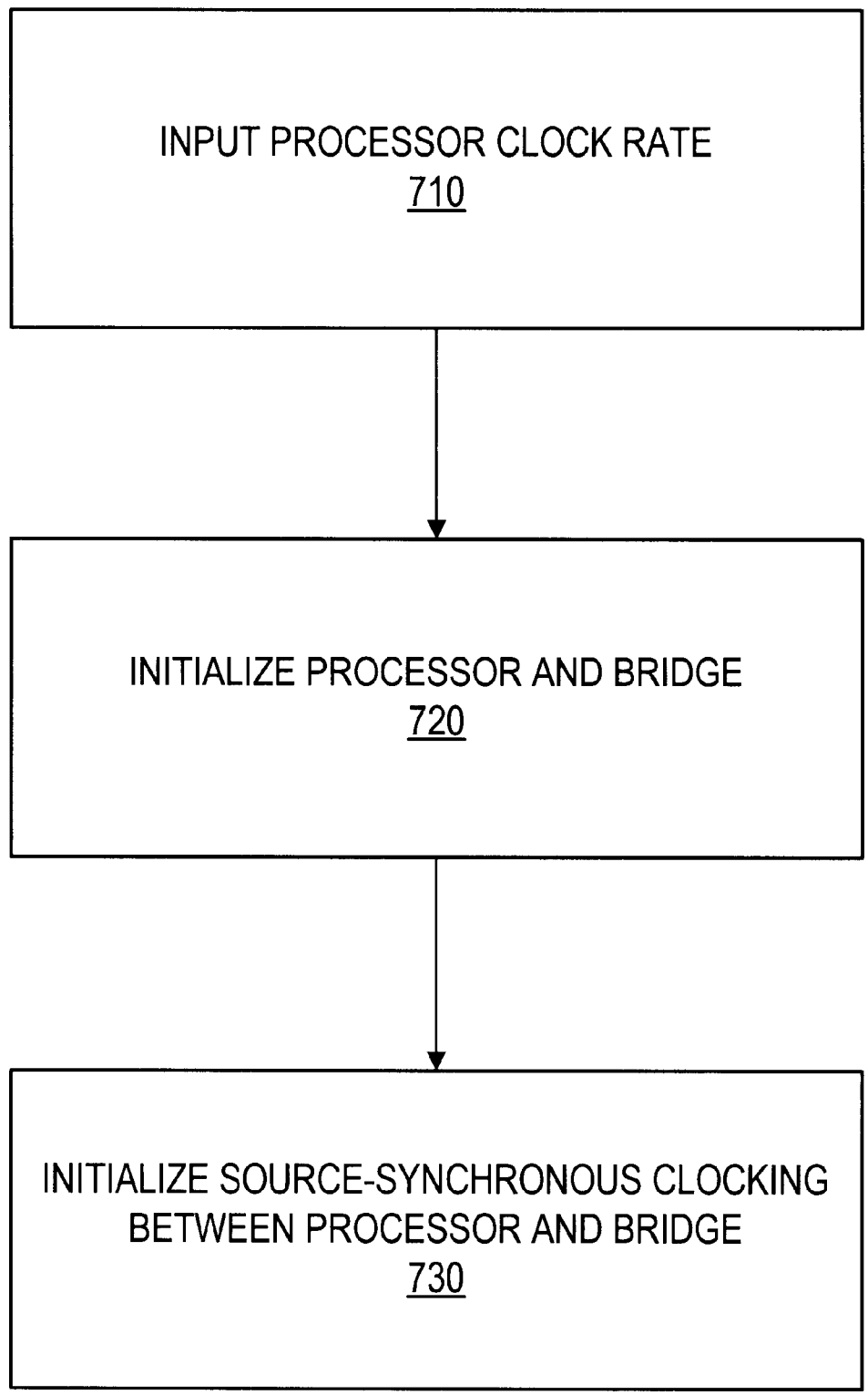
FIG. 7 is a flowchart of an embodiment of a method for initiating operation of the computer system of FIG. 1.

Turning now to FIG. 7, a flowchart of an embodiment of a method for initiating operation of the computer system 100 of FIG. 1 is illustrated. The flowchart, as illustrated, is a high level flowchart and, as such, contains broad descriptions of one embodiment of a method for initiating the operations of the computer system 100. As shown, the method comprises inputting a processor clock rate (step 710), initializing the processor 110A and the bridge 130 (step 720), and initializing source-synchronous clocking between the processor 110A and the bridge 130 (step 730). Details of a preferred embodiment for each of these steps 710, 720 and 730 are given below with respect to FIGS. 8, 9 and 10.

Figure 8:
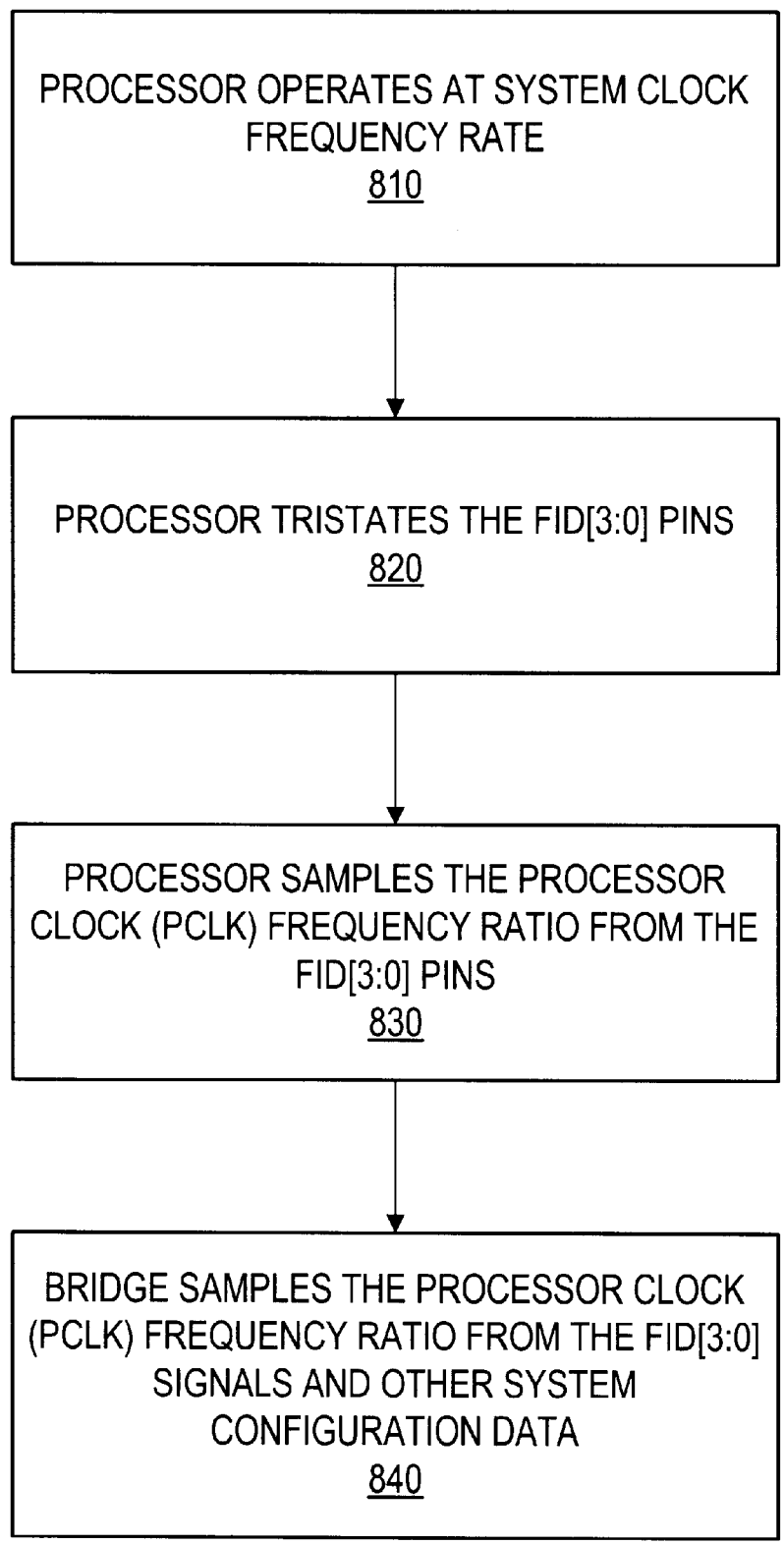
FIG. 8 is a flowchart of an embodiment of a method for inputting the processor clock rate ratio to the processor, such as is shown in FIG. 7.

Turning now to FIG. 8, a flowchart of an embodiment of a method for inputting the processor clock rate ratio to the processor, such as is shown in FIG. 7 at step 710 is illustrated. As shown, the method comprises the processor operating at the system clock frequency rate (step 810). The system clock may include RSTCLK 220 or CLKIN 215. It is noted that the system clock frequency may comprise a frequency of, for example, 50 MHz, 100 MHz, or other frequency as desired. It is noted that in various embodiments, the system clock frequency may comprise a relatively slow clock, such that synchronous data transfers may be provided between devices in the computer system 100 at the system clock frequency.

The method also includes the processor tristating the frequency ID pins FID[3:0] 305 (step 820). The method further includes the processor sampling and decoding the processor clock frequency ratio from the frequency ID pins (step 830). The method also includes the bridge 130 sampling the processor clock frequency ratio from the frequency ID 305 signals as well as the bridge 130 sampling other system configuration data from other pins or inputs (step 840). In a preferred embodiment, the processor clock frequency ratio is sampled from different signal lines by the processor and the bridge. The processor clock frequency ratio decoded is the same in this preferred embodiment.

It is noted that the frequency ID pins FID[3:0] 305 may be dedicated pins or dual use pins, as desired. It is also noted that the frequency ID pins 305 may provide the same signal to both the processor 110A and the bridge 130 through the same pins or through differing pins for each device. Likewise, the additional system configuration data sampled by the bridge in step 840 may be through the use of dedicated pins or signal line or multiple use pins or signal lines, as desired.

Figure 9:
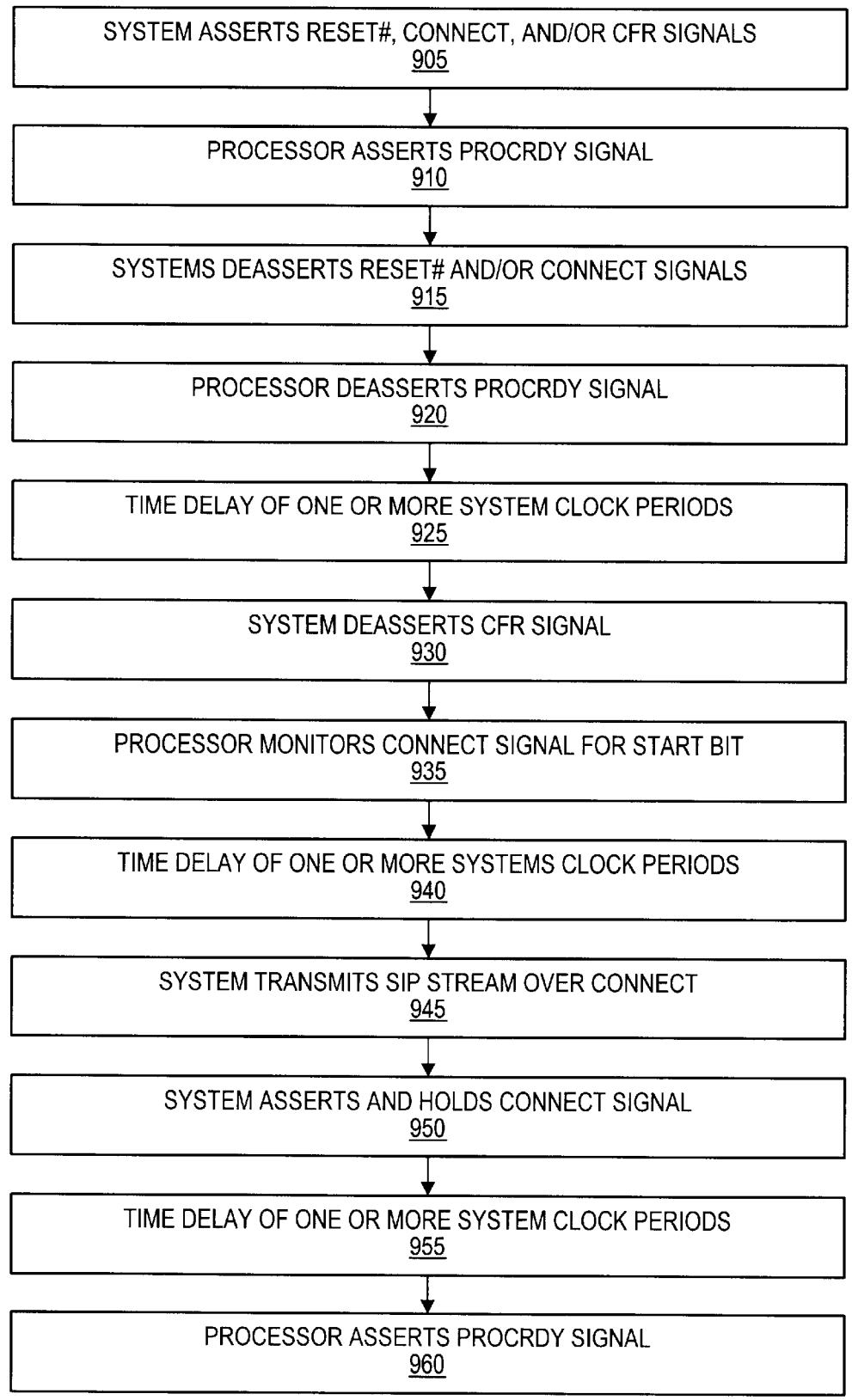
FIG. 9 is a flowchart of an embodiment of a method for initializing the processor using a SIP stream.

Turning now to FIG. 9, a flowchart of an embodiment or method for initializing the processor 110A using a SIP stream is illustrated. The method illustrated in FIG. 9 may, for example, be step 720 of the method of FIG. 7.

The method comprises system asserting the reset# signal 310, the connect line 320, and/or the CFR signal 325 (step 905). The method also comprises a processor asserting the PROCRDY signal line 330 (step 910). The method next includes the system deasserting the reset# signal 310 and/or the connect signal 320 (step 915). The processor deasserts the PROCRDY signal 330 (step 920). A time delay of one or more system clock periods may optionally occur (step 925).

The system deasserts the CFR signal 325 (step 930). The processor monitors the connect signal 320 for the start bit (step 935). An optional time delay of one or more system clock periods may occur (step 940).

The system transmits the serial SIP stream over the connect signal line 320 (step 945). The system next asserts and holds the connect signal line 320 (step 950). An optional time delay of one or more system clock periods may occur (step 955). The processor asserts the PROCRDY signal 330 (step 960), preferably to indicate that the processor 110A is ready for operation.

It is noted in step 910 that when the processor asserts the PROCRDY signal 330, that the processor may at this time, in one embodiment, convert from running at the system clock frequency to the processor clock frequency. This changeover preferably occurs as a slow ramp-up in the PLL 225. When the processor is operating at the processor frequency, instead of the system clock frequency, the processor will deassert the PROCRDY signal 330 in step 920.

Figure 10:
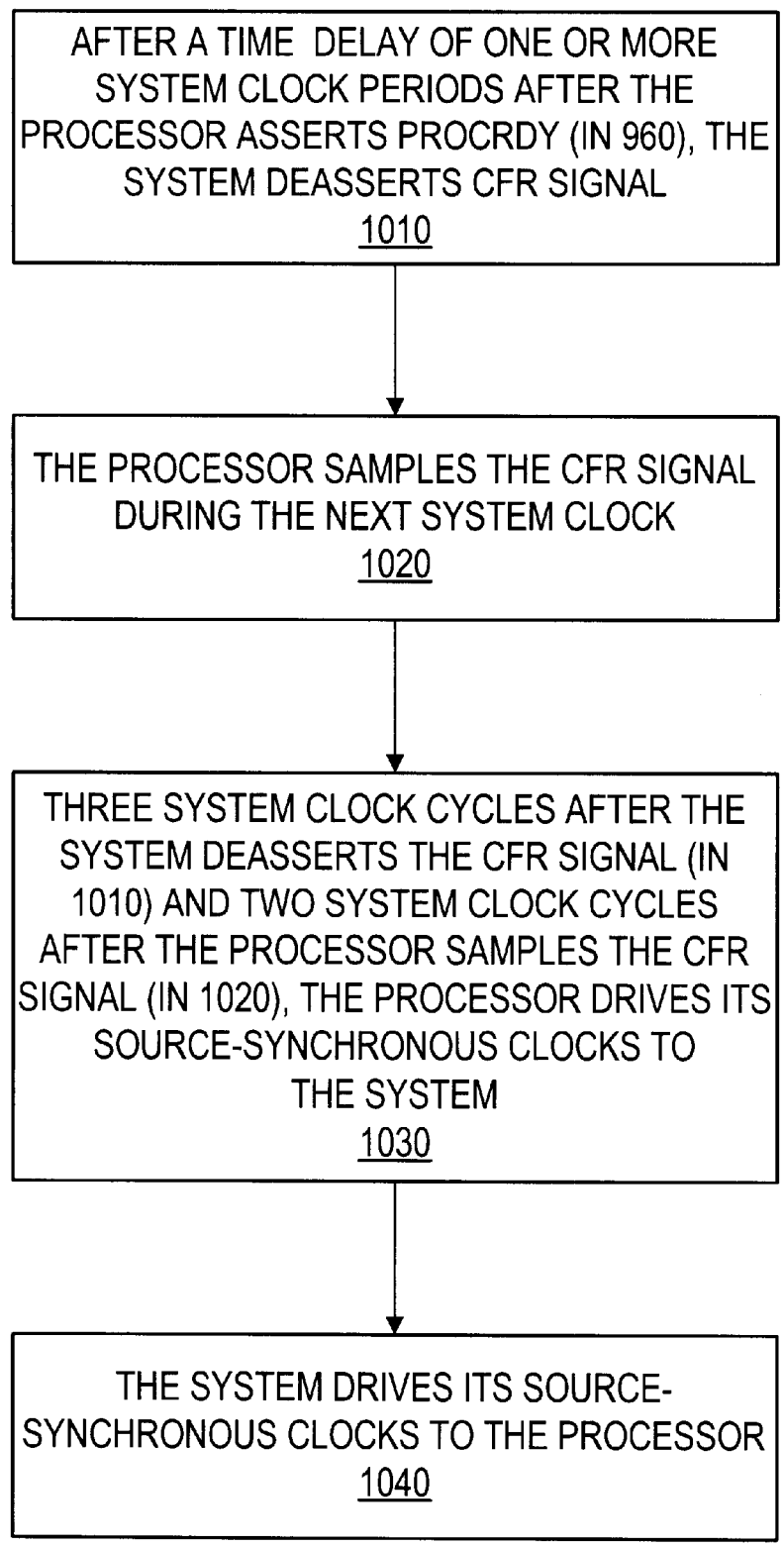
FIG. 10 is a flowchart of an embodiment of a method for initializing source-synchronous clocking between one of the processors and the bridge of FIG. 1.

Turning now to FIG. 10, a flowchart of an embodiment of a method for initializing source-synchronous clocking between one of the processors and the bridge of FIG. 1 is illustrated. While the processor 110A is operating at the system clock frequency, either RSTCLK 220 or CLKIN 215, transfers between the processor 110A and the bridge 130 are synchronous transfers at the RSTCLK 220 or CLKEND 215 frequency. The method of FIG. 10 converts transfers between the processor 110A and the bridge 130 from synchronous transfers to source-synchronous transfers, also known as clock forwarded transfers.

As shown, the method comprises that after a time delay of one or more system clock periods after the processor asserts PROCRDY 330 in step 960, the system deasserts clock forward reset 325 signal (step 1010). The processor samples the CFR signal 325 during the next system clock (step 1020). Three system clock cycles after the system deasserts the CFR 325 signal in step 1010, and two system clock cycles after the processor samples the CFR signal in step 1020, the processor drives its source-synchronous clocks to the system (step 1030). The system drives its source-synchronous clocks to the processor (step 1040).

It is noted that in a preferred embodiment the processor drives its source-synchronous clocks to the system concurrently with the system driving its source-synchronous clocks to the processor.

It is noted that in various embodiments, the start bit and the ratio bit may be embodied as multiple bits. In other words, there may be one or more start bits and one or more ratio bits at the beginning of the SIP stream. The SIP receive logic only requires one start bit even if there are multiple ratio bits. If there are multiple ratio bits, additional chains of storage elements are linked between storage element 515 and 525 similar to the way in which storage elements 515, 525, and 535 are linked between storage elements 510 and 520. Thus, when the start bit reaches the last storage element in the chain, the ratio bits may be read from the storage elements at the end of the earlier storage element chains by the control logic 540. It is noted that like storage element 530 and 535, this last storage element should be clocked on the falling edge of PCLK 230 and enabled by conditional enable signal 550 from control logic 540. It is also noted that multiple start bits may be used to ensure that noise over connect 320 is minimized so that the start of the SIP stream may be recognized. The encoding of the one or more start bits and the encoding of the one or more ratio bits may be designed for the appropriate system.

Numerous variations and modifications will become apparent to those skilled in the art once the above disclosure is fully appreciated. It is intended that the following claims be interpreted to embrace all such variations and modifications.

What is claimed is:

1. A method for initiating a serial data stream between a transmitter and a receiver, wherein the transmitter operates according to at least a first clock having a first clock rate, wherein the receiver operates according to at least a second clock having a second clock rate, wherein a ratio between the second clock rate and the first clock rate is an integer number greater than or equal to one, the method comprising:

providing a first state over a serial line between the transmitter and the receiver;

providing one or more start bits over said serial line, wherein said one or more start bits indicate a second state different from said first state;

providing one or more ratio bits over said serial line after said start bit, wherein said one or more ratio bits indicate said ratio between the second clock rate and the first clock rate;

receiving said one or more start bits;

using a transition between said first state and said second state to receive said one or more ratio bits; and receiving a remainder of said serial data stream at intervals of said second clock rate.

2. The method of claim 1, wherein said receiving said one or more start bits occurs on an edge of said second clock, and wherein said using a transition between said first state and said second state to receive said one or more ratio bits occurs on an edge of said second clock.

3. The method of claim 2, wherein said receiver is further configured to operate according to a slow clock having a slow clock rate, wherein the ratio of the second clock rate to the slow clock rate is a second integer number greater than 1, the method further comprising:

receiving said one or more start bits on an edge of said slow clock prior to said receiving said one or more start bits on said edge of said second clock; and receiving said one or more ratio bits on an edge of said slow clock prior to said using a transition between said first state and said second state to receive said one or more ratio bits on said edge of said second clock.

4. The method as recited in claim 3 further comprising decoding said ratio bit to determine said first clock rate.

5. The method as recited in claim 1, wherein said intervals of said second clock rate correspond to said first clock rate.

6. A computer system, comprising:

a memory configured to store initialization information for said computer system, wherein said initialization information begins with a start bit and a ratio bit, wherein said ratio bit is encoded with a ratio between a second clock rate and a first clock rate;

logic coupled to said memory for transmitting said initialization information, wherein said logic is configured to operate according to said first clock rate, and wherein said logic is configured to transmit said initialization information at said first clock rate; and at least one processor coupled to receive a first system clock operating at said first clock rate and a second system clock operating at said second clock rate, wherein said at least one processor is configured to operate according to said second system clock, wherein said ratio is an integer number greater than or equal to one, wherein said at least one processor is further coupled to said logic with a serial line over which to receive said initialization information;

wherein said logic is configured transmit said initialization information over said serial line to said at least one processor, wherein said logic is further configured to transmit a first state over said serial line prior to said start bit, wherein said start bit includes a second state different from said first state; and wherein said at least one processor is further configured to receive said start bit and to use a transition between said first state and said second state to receive said ratio bit, and wherein said processor is further configured to decode said ratio bit to determine said first clock rate to receive a remainder of said initialization information.

7. The system of claim 6, wherein said at least one processor is further configured to operate at a fast clock rate, wherein the ratio between said fast clock rate and said second clock rate is an integer greater than or equal to one.

8. The computer system of claim 6 further comprising a bridge that includes said memory and said logic.

9. The computer system as recited in claim 6, wherein said at least one processor is further configured to store said one or more ratio bits within a register.

10. The computer system as recited in claim 6, wherein said at least one processor is further configured to receive said one or more ratio bits on an edge of said second clock.

* * * * *